J. G. MILLER.
FISHING REEL.
APPLICATION FILED NOV. 4, 1915.
1,222,651.
Patented Apr. 17, 1917.
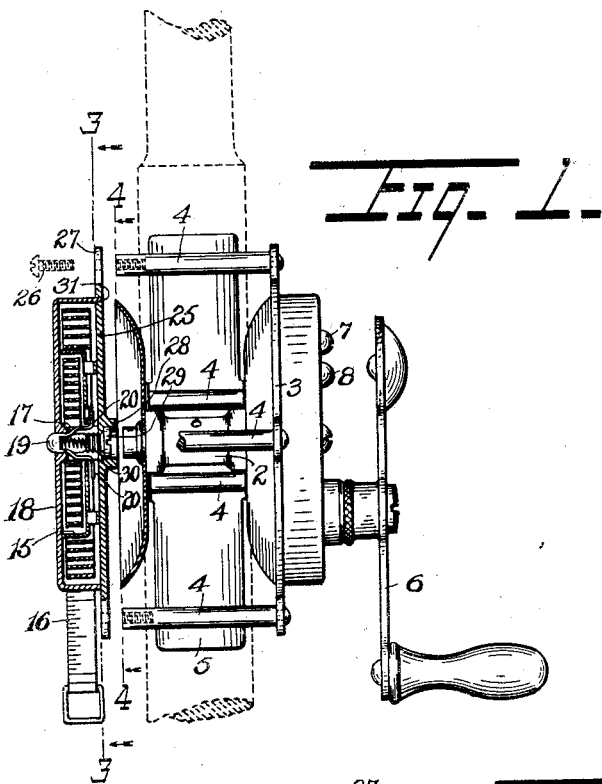
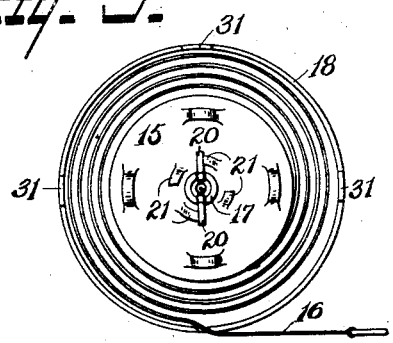
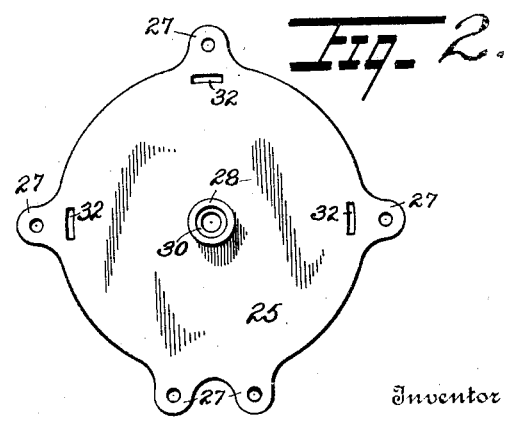
Inventor
John Gehret Miller,
By
Attorneys

UNITED STATES PATENT OFFICE.

JOHN GEHRET MILLER, OF READING, PENNSYLVANIA.

FISHING-REEL.

1,222,651.  Specification of Letters Patent.  Patented Apr. 17, 1917.

Application filed November 4, 1915. Serial No. 59,498.

*To all whom it may concern:*

Be it known that I, JOHN GEHRET MILLER, a citizen of the United States, residing at Reading, in the county of Berks and State of Pennsylvania, have invented certain new and useful Improvements in Fishing-Reels, of which the following is a specification.

My invention relates to fishing apparatus, and consists in a combination fishing reel and tape-measure as fully described in connection with the accompanying drawing and specifically pointed out in the claim; the object of the invention being to provide in simple coöperative connection with the line reel mechanism, a tape-measure reel adapted for convenient use in determining the size of any fish caught, as is frequently required to insure compliance with legal restrictions.

Figure 1 is a plan view of a fishing reel embodying my invention, as applied to a fishing rod, parts being shown as detached and in section.

Fig. 2 is a separate view of the casing wall common to both the reel and tape measure.

Fig. 3 is an inner face view of the tape measure without the common casing wall.

The winding spool or drum 2 of the fishing reel is rotatably mounted in a casing or frame comprising a side wall 3 having rigid spacing posts 4, 4, and rod-attaching plate 5; the drum shaft being rotatable in any suitable manner by a crank 6, and controlled by separate brake-device and ratchet buttons, 7 and 8 respectively, as usual. In my construction, as shown, these buttons are projected through the crank-shaft wall 3 of the casing; the opposite wall being used in common for the fishing-reel casing and the tape-reel casing of my combination device.

The tape-reel shown is mainly of ordinary construction; comprising a spring-wound drum 15 for the tape measure 16, rotatable on the hub 17 of a casing 18 and controlled by an axial spring-pressed push button 19 having pawl arms 20 slidable in slots in the hub 17 so as to engage or disengage ratchet teeth 21 on the face of the drum 15.

The common casing wall for the combined fishing-line and tape reels, consists of a disk 25, which is adapted to be secured to the posts 4, 4 of the fishing reel casing by screws 26 passing through peripheral ears 27, and which is also formed with a special hub 28 adapted to serve both as a bearing for the drum shaft of the fishing reel and as a receptacle for the head of an axial screw 29 adapted to secure the tape reel casing to said disk 25; the bore of said hub being formed as shown with a circular flange 30 against which the head of the screw is seated as the screw is drawn into the interiorly threaded hub 17 of the tape reel casing 18 in uniting the latter to the common casing wall 25. A peripheral projection 31 is provided on the casing 18 to engage a recess or aperture 32 in the wall 25 and insure against turning movement of the casing on the latter.

When the two reels are rigidly united as described they may be jointly secured to the rod as usual, and each be conveniently operated as required to the best advantage and with certainty of being available; the tape measure being readily applied to a fish before or after detaching it from the line, and the fishing reel being operative in bringing the attached fish to convenient measuring position or in catching the same as usual.

What I claim is:

As a new article of improvement a combination device comprising a fishing-line reel, a tape-measure reel, and a connecting casing wall common to both reels; the main portion of the tape-measure casing being fixedly connected to said common casing wall in axial alinement with the fishing reel, substantially as set forth.

In testimony whereof I affix my signature.

JOHN GEHRET MILLER.